May 1, 1951     F. A. BALLOU, JR     2,551,196

SECURING DEVICE FOR THE PIN STEM OF A BUTTON OR THE LIKE

Filed July 29, 1948

INVENTOR.
Frederick A. Ballou, Jr.
BY
Barlow & Barlow
Attorneys

Patented May 1, 1951

2,551,196

UNITED STATES PATENT OFFICE 2,551,196

SECURING DEVICE FOR THE PIN STEM OF A BUTTON OR THE LIKE

Frederick A. Ballou, Jr., Providence, R. I., assignor to B. A. Ballou & Co., Incorporated, a corporation of Rhode Island Application July 29, 1948, Serial No. 41,330

2 Claims. (Cl. 24—108)

This invention relates to a clutch for a lapel button pin stem or other button device having a shank extending therefrom.

In the use of a securing device of the type illustrated in Patent 2,308,412, the arms which are bent upwardly for engagement with the fingers often are more resilient than is desirable, and the binding on the stud or pin stem is somewhat insecure on off-size studs by reason of the shape of the opening for the stud.

One of the objects of this invention is to stiffen the arm of the clutch or securing device so as to provide a firmer grip upon the pin stem or stud.

Another object of this invention is to stiffen the arm by use of the stock of the arm which is already provided.

Another object of this invention is to stiffen the clutching arm by a deflection of the stock thereof.

Another object of the invention is to improve the contacting portion with the stud to permit of gripping various sizes of studs.

With these and other objects in view, the invention consists of certain novel features of construction as will be more fully described and particularly pointed out in the appended claims.

Figure 1:
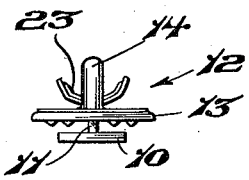
Figure 1 is a side elevation of the button showing the button back secured thereto and equipped with my improved invention.
Figure 2:
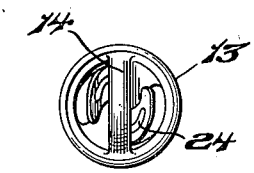
Figure 2 is a top plan view of the structure shown in Figure 1.
Figure 3:
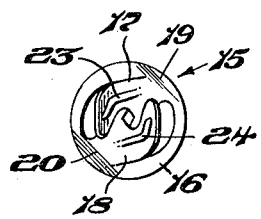
Figure 3 is a plan view of the clutch plate detached from the rest of the structure.

In proceeding with this invention I utilize a clutch plate having a rim with arms which extend from the rim in opposite directions to cross each other, each of which arms is bent upwardly through an arc to dispose the upper end at substantially 90° to the plane of the rim so as to provide a good handle for engagement by the fingers in releasing the clutch. In order to stiffen these arms the stock is deflected to provide a rib which extends generally lengthwise of the arm. This resists the bending of the arm to a substantial extent. Further I provide a diamond-shaped opening between the arms so as to provide a clip which will adjust itself to different diameters of studs or pins for better gripping and holding the pin.

With reference to the drawings, 10 designates a button with a stud, shank or pin 11 extending therefrom, while 12 designates generally the button back comprising a circular frame 13 with a bridge piece 14 extending from one edge to the other edge thereof.

Within this frame 13 a clutch plate is provided, which is designated generally 15, comprising a circular rim portion 16 with two arms 17 and 18 which extend from the rim 16 in generally diametrically opposite directions from points 19 and 20 on the rim.

Figure 4:
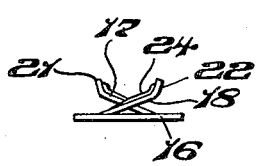
Figure 4 is an elevation of the clutch plate alone.
Figure 5:
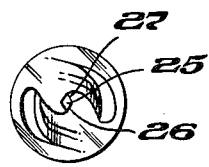
Figure 5 is a bottom view of the clutch plate.

These arms extend upwardly as shown in Figure 4 and cross each other and are bent at their ends as at 21 and 22 to extend in a direction at generally right angles to the plane of the rim 16. In order that these arms may be stiffened, ribs 23 and 24 are provided in each of the arms which ribs extend generally lengthwise of the arms.

Figure 6:
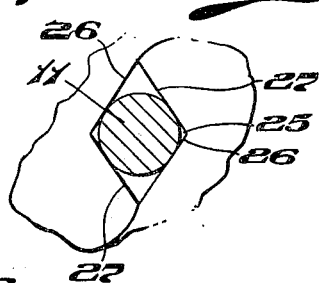
Figure 6 is an enlarged fragmental section showing the stud gripped by the clutch, as viewed in Figure 5.

A shank opening 25 is formed between the arms by notches therein. Each notch is V-shaped so that the two sides of each notch are angular as at 26 and 27, which is found to provide a much better grip upon the round stud or shank and particularly if the opening provided is diamond-shaped, as shown in Figure 6, which arrangement enables various sizes of stud and shank to be provided.

By the above arrangement the finger pieces 21 and 22 may be pushed toward each other to enlarge the size of the opening 25, and when this squeezing action is released, the arms will move so that the surfaces 26 and 27 of each of the arms will move toward each other to bind tightly the shank 11 therein.

I claim:

1. A securing device for a shank element comprising a rim, a clutch carried by the rim of flexible sheet stock having a central opening for the reception of a shank element to present edges of the sheet stock thereto and provided with a pair of operable arms crossing each other with portions extending from a point on the rim upwardly and a rib in each arm extending lengthwise thereof throughout the major portion of their length to stiffen the same and terminating at the junction of said arms with said rim to provide a single location of bending adjacent the rim.

2. A securing device as in claim 1 wherein the said arms are angled with the end portions at approximately right angles to the plane of said rim.

FREDERICK A. BALLOU, Jr.

REFERENCES CITED

The following references are of record in the file of this patent:

UNITED STATES PATENTS

| Number | Name | Date |
| --- | --- | --- |
| 1,298,643 | Baumel | Apr. 1, 1919 |
| 1,412,481 | Mendler | Apr. 11, 1922 |
| 2,308,412 | Ballou et al. | Jan. 12, 1943 |
| 2,308,424 | Morehouse | Jan. 12, 1943 |
| 2,372,922 | Winters | Apr. 3, 1945 |